United States Patent
Gao et al.

(10) Patent No.: US 10,949,042 B2
(45) Date of Patent: Mar. 16, 2021

(54) SUBSTRATE, DISPLAY APPARATUS AND CONTROL METHOD OF THE SUBSTRATE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Bo Gao, Beijing (CN); Jinxing Liu, Beijing (CN); Ming Chen, Beijing (CN); Xue Dong, Beijing (CN); Wenjia Sun, Beijing (CN); Yafei Li, Beijing (CN); Wenchao Han, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/612,050

(22) PCT Filed: Mar. 25, 2019

(86) PCT No.: PCT/CN2019/079481
§ 371 (c)(1),
(2) Date: Nov. 8, 2019

(87) PCT Pub. No.: WO2019/201056
PCT Pub. Date: Oct. 24, 2019

(65) Prior Publication Data
US 2020/0064969 A1     Feb. 27, 2020

(30) Foreign Application Priority Data

Apr. 17, 2018   (CN) .......................... 201810347073.6

(51) Int. Cl.
*G06F 3/044*     (2006.01)

(52) U.S. Cl.
CPC .......... *G06F 3/0445* (2019.05); *G06F 3/0446* (2019.05); *G06F 2203/04112* (2013.01)

(58) Field of Classification Search
CPC .. G06F 3/0446; G06F 3/0443; G06F 3/04164; G06F 3/04166; G06F 2203/04112; G06F 3/0445

See application file for complete search history.

(56) References Cited

U.S. PATENT DOCUMENTS

2017/0115813 A1*   4/2017   Chen .................... G06F 3/0445

FOREIGN PATENT DOCUMENTS

| CN | 104820532 A | 8/2015 |
|----|-------------|--------|
| CN | 106293226 A | 1/2017 |

(Continued)

OTHER PUBLICATIONS

First Office Action for CN Appl. No. 201810347073.6, dated Mar. 10, 2020.

*Primary Examiner* — Charles V Hicks
(74) *Attorney, Agent, or Firm* — The Webb Law Firm

(57) ABSTRACT

The present disclosure discloses an array substrate and a display apparatus. The array substrate includes a touch electrode, wherein the touch electrode comprises a plurality of first sensing electrodes arranged in a first direction and a plurality of second sensing electrodes arranged in a second direction, each of the first sensing electrodes comprises an electrode strip, the electrode strip comprises a plurality of electrode blocks arranged in the second direction, each of the second sensing electrodes comprises a plurality of holes, the electrode blocks correspond to the holes in one to one correspondence, and projections of the electrode blocks in a direction perpendicular to a surface of the substrate are located in the corresponding holes.

20 Claims, 5 Drawing Sheets

(56) References Cited

FOREIGN PATENT DOCUMENTS

| CN | 106293231 A | 1/2017 |
| CN | 107300994 A | 10/2017 |
| CN | 108415611 A | 8/2018 |

* cited by examiner

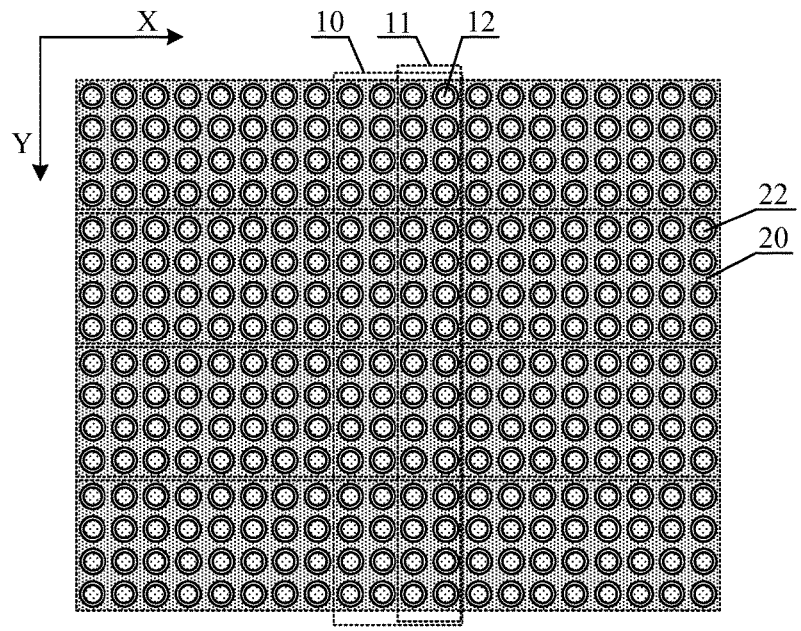

Fig. 5

| 601 | applying a first signal with a first frequency to the first sensing electrode and the second sensing electrode, to generate a first touch sensing signal associated with the first sensing electrode and a second touch sensing signal associated with the second sensing electrode |
|---|---|
| 602 | determining a first set of coordinates according to the first touch sensing signal and the second touch sensing signal |
| 603 | applying a second signal to one of the first sensing electrode and the second sensing electrode, receiving a third touch sensing signal from the other one of the first sensing electrode and the second sensing electrode |
| 604 | determining a second set of coordinates according to the third touch sensing signal |
| 605 | determining coordinates of a touch position according to the first set of coordinates and the second set of coordinates |

Fig. 6

SUBSTRATE, DISPLAY APPARATUS AND CONTROL METHOD OF THE SUBSTRATE

CROSS REFERENCE TO RELATED APPLICATIONS

This application is a U.S. National Stage Application under 35 U.S.C. § 371 of International Application No. PCT/CN2019/079481, filed on Mar. 25, 2019, which claims priority to Chinese Patent Application No. 201810347073.6, filed on Apr. 17, 2018. Both of the aforementioned applications are hereby incorporated by reference in their entireties.

TECHNICAL FIELD

The present disclosure relates to display technology field, in particular, to a substrate, a display apparatus, and a control method of the substrate.

BACKGROUND

With the development of display panel manufacturing industry, new challenges are posed to display panels in terms of touch precision and touch function expansion, such as floating touch, water droplet recognition, active pen, and proximity sensor (P-sensor).

SUMMARY

According to an aspect of the present disclosure, there is provided a substrate comprising a touch electrode, wherein the touch electrode comprises a plurality of first sensing electrodes arranged in a first direction and a plurality of second sensing electrodes arranged in a second direction different from the first direction, each of the first sensing electrodes comprises an electrode strip, the electrode strip comprises a plurality of electrode blocks arranged in the second direction, each of the second sensing electrodes having a plurality of holes, the electrode blocks correspond to the holes in one to one correspondence, and a projection of each of the electrode blocks in a direction perpendicular to the substrate is located in a corresponding hole.

In some embodiments according to the present disclosure, wherein the first sensing electrodes and the second sensing electrodes may be located in a same layer, and the electrode blocks may be located in the corresponding holes.

In some embodiments according to the present disclosure, the substrate may be an array substrate comprising a common electrode, the first sensing electrodes and the second sensing electrodes may be located in a same layer as the common electrode.

In some embodiments according to the present disclosure, the first sensing electrodes and the second sensing electrodes may comprise a transparent conductive material.

In some embodiments according to the present disclosure, the electrode blocks in each of the first sensing electrodes may be electrically connected to a driving circuit through a corresponding first metal trace.

In some embodiments according to the present disclosure, the substrate may be an array substrate including a thin film transistor, the first metal trace and a source/drain electrode of the thin film transistor are located in a same layer.

In some embodiments according to the present disclosure, each of the second sensing electrodes may be electrically connected to a driving circuit through a single second metal trace.

In some embodiments according to the present disclosure, a shape of each of the electrode blocks may be one of a circle, an ellipse, and a polygon.

In some embodiments according to the present disclosure, each of the first sensing electrodes may comprise at least two electrode strips arranged in the first direction, each electrode strips may comprise a plurality of the electrode blocks, and the electrode blocks in the same first sensing electrodes may be electrically coupled together.

In some embodiments according to the present disclosure, a width L3 of each of the electrode blocks in the first direction may be less than half of L1, a distance between two adjacent electrode strips in the first sensing electrode may be d1, and $L3<d1<(L1-L3)$; a width L4 of each of the electrode blocks in the second direction is less than half of L2, in an intersection region of the first sensing electrode and the second sensing electrode, a distance between two adjacent electrode blocks of the same electrode strip is d2, and $L4<d2<(L2-L4)$, wherein L1 is a width of the first sensing electrode in the first direction, L2 is a width of the second sensing electrode in the second direction.

In some embodiments according to the present disclosure, $4\ mm \leq L1 \leq 5\ mm$, $4\ mm \leq L2 \leq 5\ mm$.

In some embodiments according to the present disclosure, the electrode blocks of the electrode strip are equally spaced, the distance between two adjacent electrode strips in the first sensing electrode is equal to the distance between two adjacent electrode blocks in the electrode strip.

According to another aspect of the present disclosure, there is provided a display apparatus, comprising a substrate, wherein the substrate may comprise a touch electrode, the touch electrode may comprise a plurality of first sensing electrodes arranged in a first direction and a plurality of second sensing electrodes arranged in a second direction different from the first direction, each of the first sensing electrodes comprises an electrode strip, the electrode strip comprises a plurality of electrode blocks arranged in the second direction, each of the second sensing electrodes having a plurality of holes, the electrode blocks correspond to the holes in one to one correspondence, and a projection of each of the electrode blocks in a direction perpendicular to the substrate is located in a corresponding hole.

In some embodiments according to the present disclosure, the first sensing electrodes and the second sensing electrodes may be located in a same layer, and the electrode blocks may be located in the corresponding holes.

In a further aspect of the present disclosure, there is provided a control method of the substrate according to the present disclosure, comprising: applying a first signal with a first frequency to the first sensing electrode and the second sensing electrode, to generate a first touch sensing signal associated with the first sensing electrode and a second touch sensing signal associated with the second sensing electrode; determining a first set of coordinates according to the first touch sensing signal and the second touch sensing signal; applying second signals to one of the first sensing electrodes and the second sensing electrodes, receiving third touch sensing signals from the other one of the first sensing electrodes and the second sensing electrodes; determining a second set of coordinates according to the third touch sensing signal; and determining coordinates of a touch position according to the first set of coordinates and the second set of coordinates.

In some embodiments according to the present disclosure, determining a first set of coordinates according to the first touch sensing signal and the second touch sensing signal comprises determining a first coordinate of the first sensing electrode corresponding to the first touch sensing signal in the first direction, determining a second coordinate of the second sensing electrode corresponding to the second touch sensing signal in the second direction; and determining the first set of coordinates as all combinations of the first coordinate and the second coordinate.

In some embodiments according to the present disclosure, determining the second set of coordinates according to the third touch sensing signal comprises determining a third coordinate in the first direction according to the first sensing electrode corresponding to the third touch sensing signal; determining a forth coordinate in the second direction according to the second sensing electrode corresponding to the third touch sensing signal; and determining the second set of coordinates according to the third coordinate and the forth coordinate.

In some embodiments according to the present disclosure, the second signals applied to one of the first sensing electrodes and the second sensing electrodes have different frequencies for each of the sensing electrodes, and the second signals are applied to a plurality of sensing electrodes simultaneously.

In some embodiments according to the present disclosure, determining coordinates of a touch position according to the first set of coordinates and the second set of coordinates comprises determining the coordinates in the first set of coordinates that are equal to the coordinates in the second set of coordinates as the coordinates of the touch positions.

In a still further aspect of the present disclosure, there is provided a control method of the substrate according to the present disclosure, comprising: applying a first signal with a first frequency to the first sensing electrode and the second sensing electrode, to generate a first touch sensing signal associated with the first sensing electrode and a second touch sensing signal associated with the second sensing electrode; determining a first coordinate of the first sensing electrode corresponding to the first touch sensing signal in the first direction, determining a second coordinate of the second sensing electrode corresponding to the second touch sensing signal in the second direction; determining a first set of coordinates as all combinations of the first coordinate and the second coordinate; applying second signals to one of the first sensing electrodes and the second sensing electrodes, receiving third touch sensing signals from the other one of the first sensing electrodes and the second sensing electrodes, wherein the second signals have different frequencies for each of the sensing electrodes, and the second signals are applied to a plurality of sensing electrodes simultaneously; determining a third coordinate in the first direction according to the first sensing electrode corresponding to the third touch sensing signal; determining a forth coordinate in the second direction according to the second sensing electrode corresponding to the third touch sensing signal; determining the second set of coordinates according to the third coordinate and the forth coordinate; and determining the coordinates in the first set of coordinates that are equal to the coordinates in the second set of coordinates as coordinates of touch positions.

Other features and advantages of the present disclosure will be set forth in the following description, and partly become apparent from the description or be appreciated by practicing the present disclosure. The objectives and other advantages of the present disclosure can be realized and obtained by a structure particularly pointed out in the description, claims and accompanying drawings.

BRIEF DESCRIPTION OF THE DRAWINGS

The accompanying drawings are included to provide a further understanding of the technical solution of the present disclosure and are incorporated in and constitute a part of the specification, together with the embodiments of the present application are served to explain the technical solution of the present disclosure, but are not limitation thereof.

FIG. 5 is a structural schematic top view of a touch electrode of an array substrate in a second embodiment of the present disclosure; and FIG. 6 shows a control method of the substrate in accordance with an embodiment of the present disclosure.

DETAILED DESCRIPTION

To further clarify the object, the technical solution and the advantages of the present disclosure, embodiments of the present disclosure will be described in detail below in conjunction with the accompanying drawings. It should be noted that, in the case of no conflict, the embodiments in the present application and the features in the embodiments may be combined with each other arbitrarily.

Figure 1:
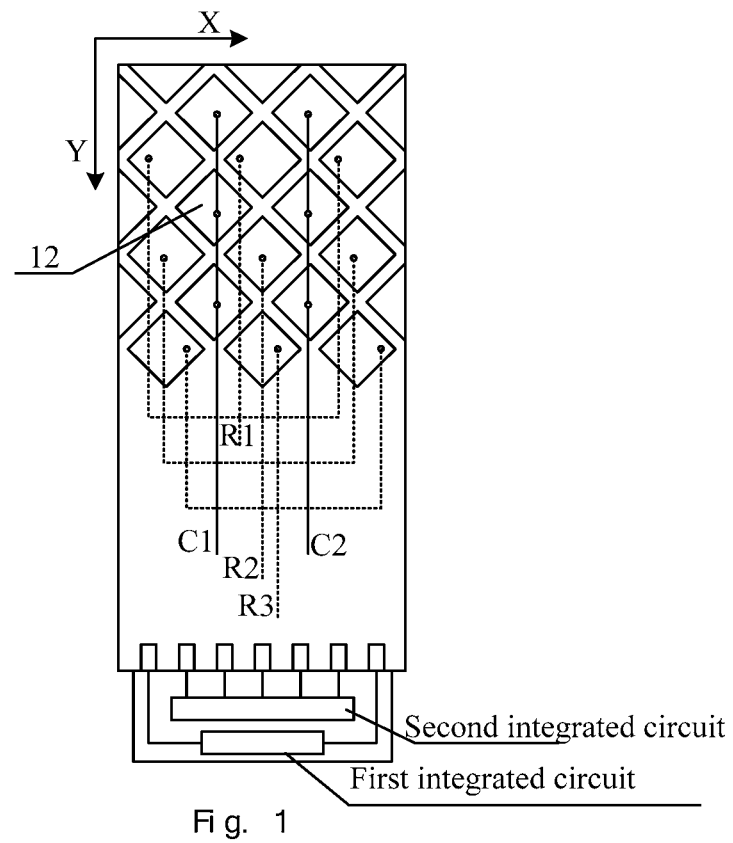
FIG. 1 is a structural schematic view of a self-mutual-integrated touch electrode of an array substrate.

FIG. 1 is a structural schematic view of a self and mutual capacitance integrated touch electrode of an array substrate. As can be seen from FIG. 1, the touch electrode includes a plurality of column sensing electrodes C arranged in a first direction X and a plurality of row sensing electrodes R arranged in a second direction Y. The row sensing electrode R and the column sensing electrode C each includes a plurality of regular diamond shaped electrode blocks arranged in sequence. A length of an edge electric field of mutual capacitance of each electrode block is a circumference of the electrode block. Taking an electrode block 12 located in the column sensing electrode C1 as an example, the length of the edge electric field of mutual capacitance of the electrode block 12 is the circumference 4a of the electrode block 12, wherein a is a length of a side of the electrode block 12. In FIG. 1, the length of the edge electric field of mutual capacitance of the electrode block is small, resulting in that a mutual capacitance performance of each electrode block cannot meet the requirement, and that a touch performance of the touch electrode is reduced. Moreover, in the self and mutual-capacitance integrated touch electrode in FIG. 1, each electrode block in the row sensing electrode is connected to a metal trace of a gate layer through a via-hole, and each electrode block in the column sensing electrode is connected to a metal trace of a source and drain layer through a via-hole, resulting in too many metal traces for connection on the array substrate, and that an aperture ratio of the display panel is reduced.

An embodiment of the present disclosure provides a substrate. The substrate includes a touch electrode. The touch electrode includes a plurality of first sensing electrodes arranged in a first direction and a plurality of second sensing electrodes arranged in a second direction. Each of the first sensing electrodes may include one or more electrode strips. Each of the electrode strips may include a plurality of electrode blocks arranged in the second direction. Each of the second sensing electrodes may include a plurality of holes, the electrode blocks may correspond to the holes in one to one correspondence, and a projection of the electrode block in a direction perpendicular to a surface of the substrate is located in the corresponding hole.

In the substrate provided in this embodiment, each second sensing electrode includes a plurality of holes, such that each second sensing electrode is an electrically connected entity on a layer where the second sensing electrode is located. The first sensing electrode includes one or more electrode strips. Each electrode strip includes a plurality of electrode blocks arranged in the second direction. Therefore, in the array substrate of this embodiment, only the first sensing electrodes need to be electrically connected to a metal trace in other layer through a via-hole, such that the first sensing electrode become an electrically connected entity. Compared to the manner in FIG. 1 in which the row sensing electrode and the column sensing electrode both need to be electrically connected to the metal trace in other layer through the via-hole, in the substrate of this embodiment, each second sensing electrode only needs one metal trace, thereby reducing the number of metal traces, increasing the aperture ratio of the display panel, and reducing a connection resistance of the second sensing electrode.

The technical content of the present disclosure will be described in detail below with specific embodiments.

Figure 2:
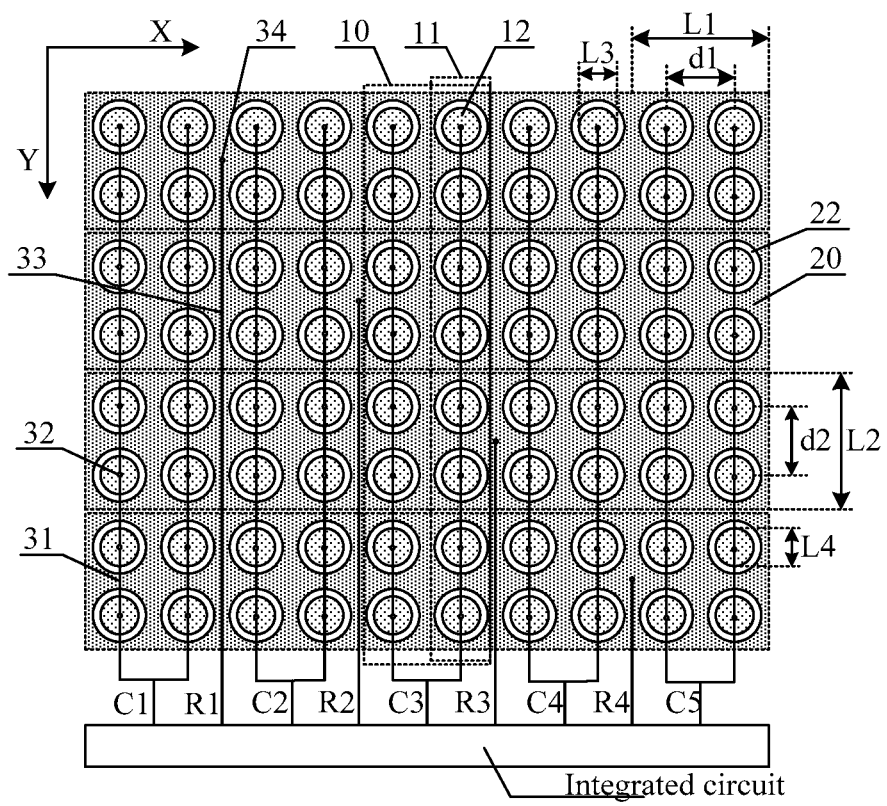
FIG. 2 is a structural schematic top view of a touch electrode of an array substrate in a first embodiment of the present disclosure.

FIG. 2 is a structural schematic top view of a substrate of a first embodiment of the present disclosure. As can be seen from FIG. 2, the substrate includes a touch electrode including a plurality of first sensing electrodes 10 arranged in a first direction X and a plurality of second sensing electrodes 20 arranged in a second direction. The first sensing electrodes 10 and the second sensing electrodes 20 intersect with each other. The first sensing electrode 10 includes an electrode strip 11, each electrode strip includes a plurality of electrode blocks 12 that are sequentially spaced apart in the second direction. The second sensing electrode 20 is strip-shaped, the second sensing electrode 20 includes a plurality of holes 22. As can be seen from FIG. 2, in an intersection region of the first sensing electrode 10 and the second sensing electrode 20, a projection of the electrode block 12 in a direction perpendicular to the surface of the substrate is located in the hole.

In some embodiments according to the present disclosure, the first sensing electrode 10 and the second sensing electrode 20 may be located in a same layer. Alternatively, the first sensing electrode 10 and the second sensing electrode 20 may be located in different layers respectively. In the case where the first sensing electrode 10 and the second sensing electrode 20 are located in the same layer, each electrode block of the first sensing electrode 10 is located in corresponding hole of the second sensing electrode 20.

It should be noted that, as an example, five first sensing electrodes 10 and four second sensing electrodes 20 are shown in FIG. 2, but it is easy to be understood that the number of the first sensing electrodes 10 included in the array substrate may be greater than or less than 5, and the number of the second sensing electrodes 20 may be greater than or less than 4. This embodiment does not specifically limit the number of the first sensing electrodes and the second sensing electrodes. Also, as an example, positions and sizes of the first sensing electrode and the second sensing electrode shown in FIG. 2 do not represent their positions and sizes in actual production. As an example, the first direction X is the direction in which the columns are located, and the second direction Y is the direction in which the rows are located. However, this embodiment does not limit the specific directions of the first direction and the second direction, for example, the first direction does not have to be perpendicular to the second direction, as long as the first direction and the second direction intersect such that the first sensing electrode and the second sensing electrode intersect with each other.

It can be seen from FIG. 2 that each first sensing electrode corresponds to a control channel, and each second sensing electrode corresponds to a control channel. Therefore, when the number of the first sensing electrodes is N and the number of the second sensing electrodes is M, the number of the channels corresponding to the touch electrodes is N+M, wherein N and M are both positive integers.

In the array substrate provided in this embodiment, the second sensing electrode 20 includes a plurality of holes, thereby each second sensing electrode 20 is an electrically connected entity, and thereby it is not necessary to connect the discrete electrodes through the via-hole and the metal trace in other layer like the second sensing electrode shown in FIG. 1. The first sensing electrode includes one or more electrode strips 11. Each electrode strip 11 includes a plurality of electrode blocks 12 spaced apart in the second direction. Therefore, in the array substrate of the embodiment, only the first sensing electrode 10 needs to make each electrode block 12 in each first sensing electrode form an electrically connected entity through the via-hole and the metal trace in other layer. Compared to the manner in FIG. 1 in which the row sensing electrode and the column sensing electrode both need to be electrically connected to the metal trace in other layer through the via-hole, the substrate of this embodiment saves a set of metal traces in other layer, so that the aperture ratio of the display panel is improved, and the connection resistance of the second sensing electrode is reduced. Meanwhile, when the number of the first sensing electrodes is N and the number of the second sensing electrodes is M, the number of the control channels corresponding to the touch electrodes of this embodiment is N+M. Compared with the number N*M of channels of touch electrodes in the case in which each touch electrode block corresponds to a control channel in the prior art, the number of channels required for the touch electrodes in this embodiment is greatly reduced, which simplifies a design of a circuit board.

As can be seen from FIG. 2, the first sensing electrode and the second sensing electrode are located in the same layer, and each of the first sensing electrodes and each of the second sensing electrodes both intersect to form an intersection region. In each of the intersection regions, the electrode blocks 12 are accommodated in the holes 22 in one to one correspondence. In some embodiments according to the present disclosure, the first sensing electrode and the second sensing electrode may also be located in different layers, the electrode block 12 corresponds to the hole 22 in one to one correspondence, and the projection of the electrode block in the direction perpendicular to the surface of the substrate is located in the corresponding hole 22.

Figure 3:
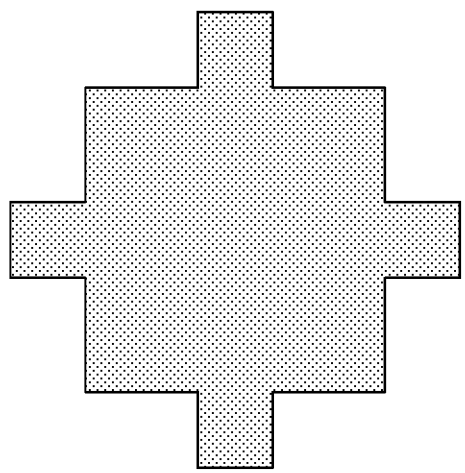
FIG. 3 shows a shape of an electrode block in another embodiment.

It can also be seen from FIG. 2 that in this embodiment, a shape of the electrode block 12 is circle, correspondingly, a shape of the hole 22 matches that of the electrode block 12. For example, when the electrode block 12 is circular, the hole 22 may also be circular or other shape capable of accommodating the circular electrode block 12. In other embodiments, the electrode block may also be elliptic, polygonal such as triangular, quadrangular and so on, or be any other shape, and a similar technical effect can be achieved. It is easy to be understood that the polygon here is not limited to a quadrangle, a pentagon, a hexagon, etc., and the polygon here may also be a polygon with a protruding or concave portion, for example, the polygon may be a quadrangle with a rectangle protruded on each side thereof, as shown in FIG. 3. FIG. 3 shows a shape of an electrode block in accordance with another embodiment of the present disclosure.

The touch electrode of this embodiment is a self and mutual-capacitance integrated touch electrode. It is understood by those skilled in the art that when the touch electrode is used as a self-capacitance electrode, the first sensing electrode and the second sensing electrode both are served as both a driving electrode and a sensing electrode. When the touch electrode is used as a mutual-capacitance electrode, in the intersection region of the first sensing electrode and the second sensing electrode, a mutual capacitance is generated at opposite edges of the first sensing electrode and the second sensing electrode. In order to guarantee the use performance of the touch electrode serving as the mutual-capacitance electrode, the first sensing electrode 10 and the second sensing electrode 20 may be disposed in the same layer.

Further, in the case where the substrate is an array substrate, in order to enable the touch electrode to function as a common electrode at the same time, the touch electrode of this embodiment, that is, the first sensing electrode 10 and the second sensing electrode 20 both, may be disposed in a common electrode layer of the array substrate.

The material of the touch electrode may be a transparent conductive material, such as indium tin oxide or the like.

It can also be seen from FIG. 2 that each electrode block 12 of each first sensing electrode 10 is connected with each other through a first metal trace 31, and the electrode block 12 is electrically connected to the first metal trace 31 through the first via-hole 32. In the case where the substrate is the array substrate, the first metal trace 31 and a source/drain electrode of a thin film transistor in the array substrate may be disposed in a same layer. Thereby, the connection resistance of the first sensing electrode 10 is further reduced.

Figure 9:
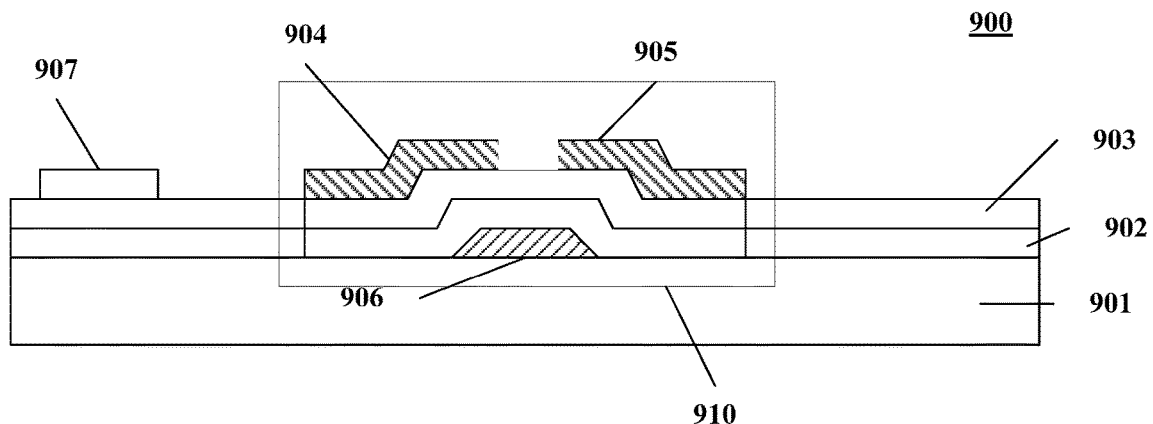
FIG. 9 shows a cross section of the substrate according to some embodiments of the present disclosure.

FIG. 9 shows a cross section of the substrate according to some embodiments of the present disclosure. As shown in FIG. 9, the substrate 900 is an array substrate. The array substrate 900 comprises a glass substrate 901, a thin film transistor 910 and a first metal trace 907. The thin film transistor 910 comprises a gate electrode 906, a gate insulation layer 902, a channel layer 903, a source electrode 904 and a drain electrode 905. The first metal trace 907, the source electrode 903 and the drain electrode 905 are disposed in the same layer.

In order to improve the mutual capacitance performance of the touch electrode, in some embodiments according to the present disclosure, the first sensing electrode 10 includes at least two electrode strips 11 arranged in the first direction X, with each electrode strip 11 having at least two electrode blocks located in the intersection region of the first sensing electrode 10 and the second sensing electrode 20.

In this embodiment, as shown in FIG. 2, the first sensing electrode 10 includes two electrode strips 11 arranged in the first direction X, with each electrode strip 11 having two electrode blocks 12 located in the intersection region of the first sensing electrode 10 and the second sensing electrode 20.

Figure 4:
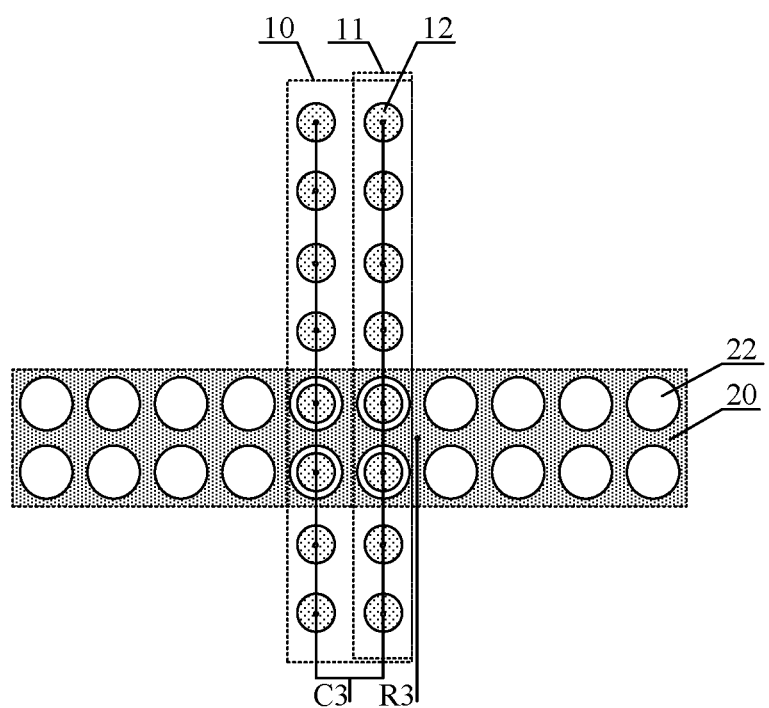
FIG. 4 is a schematic view of one of intersection regions in FIG. 2.

FIG. 4 is a schematic view of one of the intersection regions in FIG. 2. In this embodiment, the first direction X and the second direction Y intersect perpendicularly. In order to facilitate a comparison with the touch electrode in FIG. 1, it is assumed here that the side length of the electrode block in FIG. 1 is 4 mm, then the length of electric field of the mutual capacitance edge of each electrode block in FIG. 1 is 4*4 mm=16 mm. That is, in FIG. 1, the length of electric field of the mutual capacitance edge per 16 mm$^2$ is 16 mm.

In FIG. 4, it is assumed that the intersection region in FIG. 4 is a square region with a side length of 4 mm, then the area of the intersection region is 16 mm$^2$. The intersection region can be divided into four sections according to the number of electrode blocks 12 in the intersection region, and an area of each section is 4 mm$^2$. Assume that an area ratio of the electrode block 12 in each section is ½, that is, the area of each electrode block 12 is 2 mm$^2$, since the length of electric field of the mutual capacitance edge of each electrode block 12 is the circumference of the electrode block 12, in this embodiment, the length of electric field of the mutual capacitance edge of the electrode block 12 in each section is about 5 mm. Since 4 electrode blocks are contained within the intersection region, the length of electric field of the mutual capacitance edge in each intersection region is about 20 mm. From the above analysis, in a region with an area of 16 mm$^2$ as well, the length of electric field of the mutual capacitance edge (20 mm) in the first embodiment of the present disclosure is greater than the length of electric field of the mutual capacitance edge (16 mm) in FIG. 1. Therefore, compared to the touch electrode in FIG. 1, the mutual capacitance performance of the touch electrode of the substrate in this embodiment of the present disclosure is greatly improved and thereby the touch performance of the touch electrode is improved.

It is easy to be understood that the area of the intersection region of a first sensing electrode and a second sensing electrode is generally used as an area of the touch region. In this embodiment, as shown in FIG. 2, the width of the first sensing electrode 10 in the first direction X is L1, and the width of the second sensing electrode 20 in the second direction Y is L2. In order to realize the first sensing electrode 10 including at least two electrode strips 11 arranged in the first direction X, the width L3 of the electrode block 12 in the first direction X is less than half of L1. A distance between two adjacent electrode strips is d1, and L3<d1<L1−L3. In order to realize that each electrode strip 11 has at least two electrode blocks located in the intersection region of the first sensing electrode 10 and the second sensing electrode 20, the width L4 of the electrode block 12 in the second direction Y is less than half of L2. In the intersection region, a distance between two adjacent electrode blocks 12 of a same electrode strip is d2, and L4<d2<L2−L4. Those skilled in the art may understand that the size of the touch region is generally 4 mm-5 mm, therefore, in this embodiment, 4 mm≤L1≤5 mm, 4 mm≤L2≤5 mm may be selected. Thereby, in the touch region, the mutual capacitance performance generated by the touch electrode of the array substrate in this embodiment is greatly improved compared to the mutual capacitance performance in FIG. 1, and the touch performance of the touch electrode is improved.

Further, in some embodiments according to the present disclosure, the electrode blocks 12 of the electrode strip 11 may be disposed at equal intervals in sequence.

Further, in some embodiments according to the present disclosure, the distance between two adjacent electrode strips 11 in each first sensing electrode 10 may be equal to the distance between two adjacent electrode blocks 12 in the electrode strip 11, that is, d1=d2. Thereby, the electrode blocks in the intersection region of the first sensing electrode and the second sensing electrode are arranged evenly, which improves the touch uniformity of the intersection region.

It can also be seen from FIG. 2 that each electrode strip 11 in the first sensing electrode 10 is connected to each other through a first metal trace 31 and connected to a driving circuit on the substrate, and the second sensing electrode 20 is connected to the driving circuit on the substrate through a corresponding second metal trace 33. In FIG. 2, each second sensing electrode 20 is connected to a corresponding second metal trace 33 through a second via-hole 34. In some embodiments according to the present disclosure, in order to reduce the connection resistance between the second sensing electrode 20 and the second metal trace 33, the second sensing electrode 20 may be connected to the corresponding second metal trace 33 through a plurality of second via-holes 34.

In addition, since a plurality of electrode blocks are disposed in the intersection region of the first sensing electrode and the second sensing electrode in this embodiment, with respect to the touch electrode in FIG. 1, the touch electrode in this embodiment divides, by the electrode block, the intersection region of the first sensing electrode and the second sensing electrode into more micro touch regions, thereby the touch electrode in this embodiment is more advantageous for the realization of an active pen touch control, and the touch performance of the active pen is improved.

FIG. 5 is a structural schematic top view of a substrate in a second embodiment of the present disclosure. The touch electrode in this embodiment differs from that in the first embodiment in that, as shown in FIG. 5, in this embodiment, each first sensing electrode 10 includes 4 electrode strips 11 arranged in the first direction X, with each electrode strip 11 having four electrode blocks located in the intersection region of the first sensing electrode and the second sensing electrode.

In order to illustrate the difference between this embodiment and the embodiment shown in FIG. 2 more clearly, only the pattern of the first sensing electrode and the second sensing electrode is shown in FIG. 5. According to some embodiments of the present disclosure, the first sensing electrode and the second sensing electrode may be located in the same layer, for example, both of which are located in a common electrode layer or a separate layer of the array substrate.

Figure 7:
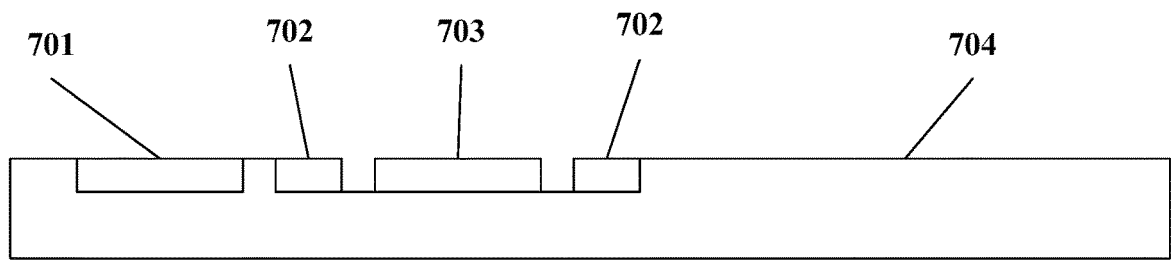
FIG. 7 shows a cross section of the substrate according to some embodiments of the present disclosure.

FIG. 7 shows a cross section of the substrate according to some embodiments of the present disclosure. As shown in FIG. 7, the substrate 704 is an array substrate. The common electrode 701, the first sensing electrode 703 and the second sensing electrode 702 are located in the same layer.

Figure 8:
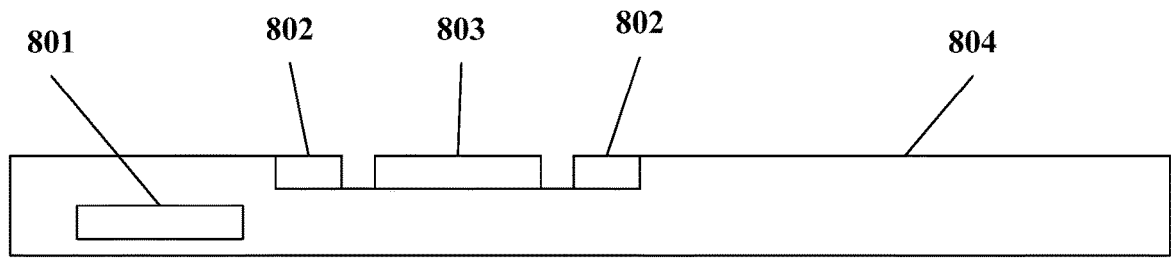
FIG. 8 shows a cross section of the substrate according to some embodiments of the present disclosure.

According to some other embodiments of the present disclosure, the first sensing electrode and the second sensing electrode may also be located in different layers respectively. FIG. 8 shows a cross section of the substrate according to some embodiments of the present disclosure. As shown in FIG. 8, the substrate 804 is an array substrate. The common electrode 801, the first sensing electrode 803 and the second sensing electrode 802 are located in different layers.

In FIG. 5, assume that the intersection region in FIG. 5 is a square region with a side length of 4 mm, then the area of the intersection region is 16 mm². The intersection region can be divided equally into 16 sections according to the number of the electrode blocks 12 in the intersection region, and the area of each section is 1 mm². In general, the area ratio of the electrode block 12 in each section is ½, that is, the area of each electrode block 12 is 0.5 mm², since the length of electric field of the mutual capacitance edge of each electrode block 12 is the circumference of the electrode block 12, in this embodiment, the length of electric field of the mutual capacitance edge of the electrode block 12 in each section is about 2.5 mm. Since 16 electrode blocks are contained within the intersection region, the length of electric field of the mutual capacitance edge in each intersection region is about 40 mm. It can be seen from the above analysis that, in a region with a same area of 16 mm², the length of electric field of the mutual capacitance edge (40 mm) in the second embodiment of the present disclosure is greater than the length of electric field of the mutual capacitance edge (16 mm) in FIG. 1. Thus, compared with the touch electrode in FIG. 1, the mutual capacitance performance of the touch electrode of the array substrate in this embodiment is greatly improved, and thereby the touch performance of the touch electrode is improved.

Based on the inventive concept of the foregoing embodiments, an embodiment of the present disclosure further provides a touch apparatus including the substrate according to various embodiments of the present disclosure. The display apparatus can be included in any product or component with a display function, such as a mobile phone, a tablet computer, a television, a display, a laptop, a digital photo frame, a navigator, and the like.

FIG. 6 shows a control method of a substrate in accordance with an embodiment of the present disclosure. The control method mainly includes the following steps:

applying a first signal with a first frequency to the first sensing electrode and the second sensing electrode, to generate a first touch sensing signal associated with the first sensing electrode and a second touch sensing signal associated with the second sensing electrode (601);

determining a first set of coordinates according to the first touch sensing signal and the second touch sensing signal (602);

applying a second signal to one of the first sensing electrode and the second sensing electrode, receiving a third touch sensing signal from the other one of the first sensing electrode and the second sensing electrode (603);

determining a second set of coordinates according to the third touch sensing signal (604); and determining a coordinate of a touch position according to the first set of coordinates and the second set of coordinates (605).

Wherein determining a first set of coordinates according to the first touch sensing signal and the second touch sensing signal includes:

determining a first coordinate of the first sensing electrode corresponding to the first touch sensing signal in the first direction, determining a second coordinate of the second sensing electrode corresponding to the second touch sensing signal in the second direction;

determining the first set of coordinates as all combinations of the first coordinate and the second coordinate.

Wherein determining the second set of coordinates according to the third touch sensing signal includes:

determining a third coordinate in the first direction according to the first sensing electrode corresponding to the third touch sensing signal, determining a forth coordinate in the second direction according to the second sensing electrode corresponding to the third touch sensing signal, determining the second set of coordinates according to the third coordinate and the fourth coordinate.

In some embodiments according to the present disclosure, the second signal applied to one of the first sensing electrode and the second sensing electrode has different frequencies for each of the sensing electrodes, so that it is capable to apply the second signal to a plurality of sensing electrodes simultaneously.

The control method of the substrate in the embodiment of the present disclosure will be described in detail below by taking the substrate in the embodiment shown in FIG. 2 as an example. There are 5 first sensing electrodes in the first direction X and 4 second sensing electrodes in the second direction Y. For convenience of explanation, it is assumed that the frequency of the first signal is 30 kHz and the frequency of the second signal is 60 kHz. It is easy to be understood that, in actual implementations, the frequency of the first signal and the frequency of the second signal can be set as required.

In some embodiments according to the present disclosure, a driving signal may be simultaneously applied to each of the first sensing electrodes and each of the second sensing electrodes, with the driving signal including a first signal and a second signal. For example, the driving signal is simultaneously applied to 5 first sensing electrodes and 4 second sensing electrodes. The driving signal includes the first signal and the second signal. For example, the first signal and the second signal are superposed or spaced periodically to form the driving signal.

The first set of coordinates of the touch position under the first signal is determined. In this embodiment, under the first frequency signal, the touch electrode is served as a self-capacitive touch electrode. Specifically, the first touch sensing signal of each first sensing electrode under the first signal is received, and the second touch sensing signal of each second sensing electrode under the first signal is received; a position coordinate $X_i$ of the first sensing electrode in the first direction (for example, the X direction) corresponding to the first touch sensing signal is determined, and a position coordinate $Y_j$ of the second sensing electrode in the second direction (for example, the Y direction) corresponding to the second touch sensing signal is determined; the position coordinate $X_i$ with the position coordinate $Y_j$ are combined to obtain the first set of coordinates $(X_i, Y_j)$ of the touch position, wherein i and j are both positive integers. When a single-point touch is performed, only one point is touched, so that only one $X_i$ value and one $Y_j$ value are obtained, thereby the first set of coordinates $(X_i, Y_j)$ has only one position. In the self-capacitive touch electrode, a "ghost point" may occur, that is, when multi-point touch is performed, the first set of coordinates obtained may include a plurality of coordinates. For example, in the case of a two-point touch (i.e., when two points, for example $(X_2, Y_4)$ and $(X_4, Y_2)$, are touched simultaneously, two coordinates in the first direction, for example $X_2$ and $X_4$, may be obtained, also two coordinates in the second direction, for example $Y_2$ and $Y_4$, may be obtained. Four positions, namely $(X_2, Y_2)$, $(X_2, Y_4)$, $(X_4, Y_2)$, $(X_4, Y_4)$, may be obtained by combining these coordinates in the first direction and the second direction. Only $(X_2, Y_4)$ and $(X_4, Y_2)$ are the actual positions touched, while $(X_2, Y_2)$, $(X_4, Y_4)$ are called as "ghost points".

A second signal is applied to one of the first sensing electrode and the second sensing electrode, a third touch sensing signal is received from the other one of the first sensing electrode and the second sensing electrode, and the second set of coordinates is determined according to the third touch sensing signal. In some embodiments according to the present disclosure, the touch electrode is served as a mutual-capacitive touch electrode under the second signal.

In some embodiments according to the present disclosure, the second signal is applied to the first sensing electrode, and a signal received from the second sensing electrode is served as the third touch sensing signal. In order to receive the touch sensing signal simultaneously, the frequencies of the second signals applied to each of the first sensing electrodes are different. For example, the frequency of the second signal applied to the first sensing electrode at $X_1$ is (60 k−200) Hz, the frequency of the second signal applied to the first sensing electrode at $X_2$ is (60 k−100) Hz, the frequency of the second signal applied to the first sensing electrode at $X_3$ is 60 k Hz, the frequency of the second signal applied to the first sensing electrode at $X_4$ is (60 k+100) Hz, and the frequency of the second signal applied to the first sensing electrode at $X_5$ is (60 k+200) Hz. It is easy to be understood that the above is for illustrative purposes only, but not a limitation to the second signal of each first sensing electrode, as long as the second signals applied to each of the first sensing electrodes have different frequencies.

The third touch sensing signal is received at the second sensing electrode, and a position coordinate $X_m$ of a corresponding first sensing electrode in the first direction and a position coordinate $X_n$ of a corresponding second sensing electrode in the second direction are determined. Specifically, since the frequency of the second signal on each of the first sensing electrodes is different, when the touch position on the touch electrode is different, the third touch sensing signal received at the second sensing electrode is also different. Therefore, the corresponding first sensing electrode and second sensing electrode may be determined uniquely according to the third touch sensing signal, the position coordinate $X_m$ of the first sensing electrode in the first direction and the position coordinate $X_n$ of the second sensing electrode in the second direction may be determined according to the channel of the first sensing electrode and the channel of the second sensing electrode, wherein m and n are positive integers. For example, when the touch position is located at the intersection position of the first sensing electrode at $X_1$ and the second sensing electrode at $Y_1$, the third touch sensing signal is V1, and when the touch position is located at the intersection position of the first sensing electrode at $X_3$ and the second sensing electrode at $Y_3$, the third touch sensing signal is V2 different from V1, so V1 uniquely corresponds to $X_1$ and $Y_1$, and V2 uniquely corresponds to $X_3$ and $Y_3$.

A second set of coordinates $(X_m, Y_n)$ of the touch position is obtained. For the mutual-capacitive touch electrode, in the case of the two-point touch, the second set of coordinates $(X_m, Y_n)$ includes coordinates of two points, for example $(X_2, Y_4)$ and $(X_4, Y_2)$.

According to the first set of coordinates and the second set of coordinates, actual coordinates of the touch position is determined. Specifically, whether each coordinate in the first set of coordinates is equal to each coordinate in the second set of coordinates is determined, the coordinates in the first set of coordinates that is equal to the coordinates in the second set of coordinates is the actual coordinates of the touch position. For example, in the case of the two-point touch, the first set of coordinates is, for example, $(X_2, Y_2)$, $(X_2, Y_4)$, $(X_4, Y_2)$, $(X_4, Y_4)$, the second set of coordinates is, for example, $(X_2, Y_4)$ and $(X_4, Y_2)$. The equal coordinates in the first set of coordinates and the second set of coordinates are $(X_2, Y_4)$ and $(X_4, Y_2)$, then $(X_2, Y_4)$ and $(X_4, Y_2)$ are the actual coordinates of the touch positions.

In this embodiment, under the mutual-capacitance mode, the first sensing electrode is served as a driving electrode, and the second sensing electrode is served as a receiving electrode. It is easy to be understood that the first sensing electrode may also be served as the receiving electrode, while the second sensing electrode may be served as the driving electrode, the same technical effect may be obtained.

In the control method of the touch electrode in the embodiment of the present disclosure, the actual coordinate of the touch position is determined by the first set of coordinates in the self-capacitance mode and the second set of coordinates in the mutual-capacitance mode together, the ghost point of the touch electrode in the self-capacitance mode alone may be eliminated, and a position of a non-finger touch such as a water drop may be sensed in the mutual-capacitance mode. With both the advantages of the touch electrode in the self-capacitance mode and in the mutual-capacitance mode, accuracy of the touch position of the touch electrode is improved. Meanwhile, the control method of the touch electrode receives the touch sensing signal on each sensing electrode simultaneously, which improves the working efficiency of the touch electrode compared to line-by-line scanning and column-by-column receiving in the prior art. In addition, through selecting a suitable driving signal, that is, a first frequency signal and a second frequency signal, the touch electrode can serve a touch function without affecting its function as a common electrode, and a display time is not occupied.

Figure 10:
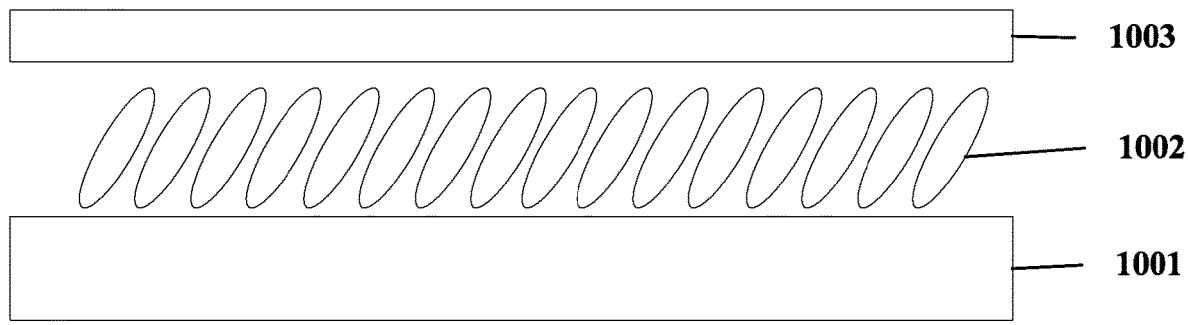
FIG. 10 shows a display apparatus according to some embodiments of the present disclosure.

FIG. 10 shows a display apparatus according to some embodiments of the present disclosures. As shown in FIG. 10, the display apparatus 1000 comprises an array substrate 1001, a counterpart substrate 1003 and a layer 1002 of liquid crystal. The counterpart substrate 1003 comprises a color filter. The array substrate 1001 has a structure as described above with reference to the FIGS. 1-5 and 7-9.

In the description of the embodiments of the present disclosure, it is to be understood that an azimuth or positional relationship indicated by terms "middle", "upper", "lower", "front", "back", "vertical", "horizontal", "top", "bottom", "inside", "outside" and the like is based on the azimuth or positional relationship shown in the drawings, merely for the purpose of facilitating the description of the present disclosure and simplified description, rather than indicating or implying that the device or element referred to must have a specific azimuth or be constructed and operated in a particular azimuth, therefore it cannot be construed as a limitation to the present disclosure.

In the description of the embodiments of the present disclosure, it should be noted that the terms "mount", "connect", "connection" should be broadly understood unless otherwise specified and defined, for example, it may be a fixed connection or a removable connection, or an integral connection, or a mechanical connection or an electrical connection, or a direct connection, or an indirect connection through an intermediate medium, or an internal connection between two elements. For those ordinarily skilled in the art, the specific meanings of the above terms in the present disclosure may be interpreted according to particular situations.

While the implementations of the present disclosure have been disclosed above, the described contents are merely the implementations employed for understanding the present disclosure conveniently and are not intended to limit the present disclosure. Any modification and variation in the implementing form and details may be made by those skilled in the art without departing from the disclosed spirit and scope of the present disclosure. However, the scope of patent protection of the present disclosure is to be determined by the accompanying claims.

What is claimed is:

1. A substrate comprising a touch electrode, wherein the touch electrode comprises a plurality of first sensing electrodes arranged in a first direction and a plurality of second sensing electrodes arranged in a second direction different from the first direction,
    each of the plurality of first sensing electrodes comprises an electrode strip, the electrode strip comprises a plurality of electrode blocks arranged in the second direction, each of the plurality of electrode blocks in the electrode strip are connected with each other through a first metal trace, each of the plurality of the second sensing electrodes is strip-shaped and extending in the first direction, each of the plurality of second sensing electrodes having a plurality of holes, the plurality of electrode blocks correspond to the plurality of holes in one to one correspondence, and a projection of each of the plurality of electrode blocks in a direction perpendicular to the substrate is located in a corresponding hole of the plurality of holes.

2. The substrate according to claim 1, wherein the plurality of first sensing electrodes and the plurality of second sensing electrodes are located in a same layer, and the plurality of electrode blocks are located in the corresponding plurality of holes.

3. The substrate according to claim 1, wherein the substrate is an array substrate comprising a common electrode, the plurality of first sensing electrodes and the plurality of second sensing electrodes are located in a same layer as the common electrode.

4. The substrate according to claim 1, wherein the plurality of first sensing electrodes and the plurality of second sensing electrodes comprise a transparent conductive material.

5. The substrate according to claim 1, wherein the plurality of electrode blocks in each of the plurality of first sensing electrodes are electrically connected to a driving circuit through a corresponding first metal trace.

6. The substrate according to claim 5, wherein the substrate is an array substrate including a thin film transistor, the first metal trace and a source/drain electrode of the thin film transistor are located in a same layer.

7. The substrate according to claim 1, wherein each of the plurality of second sensing electrodes is electrically connected to a driving circuit through a single second metal trace.

8. The substrate according to claim 1, wherein a shape of each of the plurality of electrode blocks is one of a circle, an ellipse, and a polygon.

9. The substrate according to claim 1, wherein each of the plurality of first sensing electrodes comprises at least two electrode strips arranged in the first direction, each electrode strips comprises the plurality of electrode blocks, and the plurality of electrode blocks in a same first sensing electrode of the plurality of first sensing electrodes are electrically coupled together.

10. The substrate according to claim 9, wherein
    a width L3 of each of the plurality of electrode blocks in the first direction is less than half of L1, a distance between two adjacent electrode strips in the first sensing electrode is d1, and L3<d1<(L1−L3);
    a width L4 of each of the plurality of electrode blocks in the second direction is less than half of L2, in an intersection region of the first sensing electrode and the second sensing electrode, a distance between two adjacent electrode blocks of the same electrode strip is d2, and L4<d2<(L2−L4), wherein L1 is a width of the first sensing electrode in the first direction, L2 is a width of the second sensing electrode in the second direction.

11. The substrate according to claim 10, wherein 4 mm≤L1≤5 mm, 4 mm≤L2≤5 mm.

12. The substrate according to claim 9, wherein the plurality of electrode blocks of the electrode strip are equally spaced, the distance between two adjacent electrode strips in the first sensing electrode is equal to the distance between two adjacent electrode blocks in the electrode strip.

13. A display apparatus, comprising a substrate, wherein the substrate comprises a touch electrode, the touch electrode comprises a plurality of first sensing electrodes arranged in a first direction and a plurality of second sensing electrodes arranged in a second direction different from the first direction, each of the plurality of first sensing electrodes comprises an electrode strip, the electrode strip comprises a plurality of electrode blocks arranged in the second direction, each of the plurality of electrode blocks in the electrode strip are connected with each other through a first metal trace, each of the plurality of the second sensing electrodes is strip-shaped and extending in the first direction, each of the plurality of the second sensing electrodes having a plurality of holes, the plurality of electrode blocks correspond to the holes in one to one correspondence, and a projection of each of the plurality of electrode blocks in a direction perpendicular to the substrate is located in a corresponding hole.

14. The display apparatus according to claim 13, wherein the plurality of first sensing electrodes and the plurality of second sensing electrodes are located in a same layer, and the plurality of electrode blocks are located in the corresponding plurality of holes.

15. A control method of the substrate according to claim 1, comprising:

applying a first signal with a first frequency to the first sensing electrode and the second sensing electrode, to generate a first touch sensing signal associated with the first sensing electrode and a second touch sensing signal associated with the second sensing electrode;

determining a first set of coordinates according to the first touch sensing signal and the second touch sensing signal;

applying second signals to one of the plurality of first sensing electrodes and plurality of the second sensing electrodes, receiving third touch sensing signals from the other one of the plurality of first sensing electrodes and the plurality of second sensing electrodes;

determining a second set of coordinates according to the third touch sensing signals; and determining coordinates of a touch position according to the first set of coordinates and the second set of coordinates.

16. The method according to claim 15, wherein determining the first set of coordinates according to the first touch sensing signal and the second touch sensing signal comprises determining a first coordinate of the first sensing electrode corresponding to the first touch sensing signal in the first direction, determining a second coordinate of the second sensing electrode corresponding to the second touch sensing signal in the second direction; and determining the first set of coordinates as all combinations of the first coordinate and the second coordinate.

17. The method according to claim 15, wherein determining the second set of coordinates according to the third touch sensing signals comprises determining a third coordinate in the first direction according to the first sensing electrode corresponding to the third touch sensing signal;

determining a forth coordinate in the second direction according to the second sensing electrode corresponding to the third touch sensing signal; and determining the second set of coordinates according to the third coordinate and the forth coordinate.

18. The method according to claim 15, wherein the second signals, applied to one of the plurality of first sensing electrodes and the plurality of second sensing electrodes, have different frequencies, and wherein the second signals are simultaneously applied to one of the plurality of first sensing electrodes and the plurality of second sensing electrodes.

19. The method according to claim 15, wherein determining coordinates of a touch position according to the first set of coordinates and the second set of coordinates comprises determining the coordinates in the first set of coordinates that are equal to the coordinates in the second set of coordinates as the coordinates of the touch positions.

20. A control method of the substrate according to claim 1, comprising:

applying a first signal with a first frequency to a first sensing electrode of the plurality of first sensing electrodes and a second sensing electrode of the plurality of second sensing electrodes, to generate a first touch sensing signal associated with the first sensing electrode and a second touch sensing signal associated with the second sensing electrode;

determining a first coordinate of the first sensing electrode corresponding to the first touch sensing signal in the first direction, determining a second coordinate of the second sensing electrode corresponding to the second touch sensing signal in the second direction;

determining a first set of coordinates as all combinations of the first coordinate and the second coordinate;

applying second signals to one of the plurality of first sensing electrodes and the plurality of second sensing electrodes, and receiving third touch sensing signals from the other one of the plurality of first sensing electrodes and the plurality of second sensing electrodes, wherein the second signals have different frequencies, and wherein the second signals are simultaneously applied to one of the plurality of first sensing electrodes and the plurality of second sensing electrodes;

determining a third coordinate in the first direction according to the first sensing electrode corresponding to the third touch sensing signal;

determining a forth coordinate in the second direction according to the second sensing electrode corresponding to the third touch sensing signal;

determining the second set of coordinates according to the third coordinate and the forth coordinate; and determining the coordinates in the first set of coordinates that are equal to the coordinates in the second set of coordinates as coordinates of touch positions.

* * * * *

UNITED STATES PATENT AND TRADEMARK OFFICE
CERTIFICATE OF CORRECTION

PATENT NO. : 10,949,042 B2
APPLICATION NO. : 16/612050
DATED : March 16, 2021
INVENTOR(S) : Bo Gao et al.

Page 1 of 1

It is certified that error appears in the above-identified patent and that said Letters Patent is hereby corrected as shown below:

In the Claims

Column 16, Line 10, Claim 17, delete "forth" and insert -- fourth --

Column 16, Line 14, Claim 17, delete "forth" and insert -- fourth --

Column 16, Line 57, Claim 20, delete "forth" and insert -- fourth --

Column 16, Line 61, Claim 20, delete "forth" and insert -- fourth --

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*